United States Patent Office 2,955,082
Patented Oct. 4, 1960

2,955,082

METHOD OF DRILLING A WELL WITH AN OIL BASE DRILLING FLUID CONTAINING AN ALCOHOL-WET RESINATE

James L. Lummus, Tulsa, Okla., assignor to Pan American Petroleum Corporation, Tulsa, Okla., a corporation of Delaware No Drawing. Filed Jan. 14, 1957, Ser. No. 633,831

2 Claims. (Cl. 252—8.5)

This invention relates to fluids such as those used in drilling, completing, or working over oil and gas wells. More particularly, it relates to fluids of the oil base type suitable for the above-mentioned uses.

Several oil base drilling fluids have been proposed which employ the heavy metal salts of rosin acids as inexpensive additives. Modifications of this concept have included a concentrate taught in 2,573,960 Fischer. This concentrate includes glycols together with the heavy metal salts of rosin acids. These drilling fluids and concentrates have enjoyed some commercial success. I have found, however, that improvements would be desirable in gel properties of such fluids particularly at high temperatures. The fluid loss of such drilling fluids also becomes rather high at elevated temperatures.

An object of my invention is to provide a rosin acid salt preparation which is suitable as an additive for preparing oil base drilling fluids having improved properties. A more specific object is to provide a rosin acid salt preparation which will improve the gel strength and fluid loss properties of oil base drilling fluids, particularly at elevated temperatures. Additional objects include the preparation of an improved oil base drilling fluid and method for use of such a drilling fluid. Still other objects will occur to those skilled in the art from the following description and claims.

In general, I accomplish the objects of my invention by wetting certain alkali metal salts of rosin acids with a low molecular weight monohydric alcohol and dispersing the alcohol-wet salt in an oil. Several factors are critical as will appear from the following detailed description.

The type of rosin acids does not appear to be critical, however. These acids may be in a purified form such as abietec acid or may be in ordinary form, such as wood rosin, gum rosin, tall oil rosin, or the like. The rosins may be unmodified, or they may be modified by disproportionation, isomerization, polymerization, or the like, so long as the carboxylic acid group is not destroyed or otherwise made inactive.

The metal ion of the soap is critical. It must be an alkali metal and among these only sodium is attractive from either a technical or an economic standpoint. Potassium and lithium are at least somewhat operable from a technical standpoint, particularly if special techniques are used to obtain the desired type of dispersion in oil. In the absence of such techniques even potassium and lithium cannot be considered to be at all equivalent to sodium.

Soaps of the heavy or polyvalent metals such as calcium, aluminum, and the like, are already too oil-soluble to impart good gel strength and fluid loss properties to the oil. This is particularly true at elevated temperatures. When these soaps are wet with alcohol they become even more oil soluble. This explains the limitation to alkali metal soaps.

Potassium soaps of rosin acids behave somewhat like the heavy metal soaps but for a different reason. The potassium soaps are generally viscous liquids. They tend to disperse in oil if the mixture of soap and oil is vigorously agitated even in the absence of alcohol. This is simply the dispersion of one liquid in another as an emulsion. The soft particles of dispersed potassium soaps produce only a small increase in gel strength and a limited decrease in fluid loss. When the potassium soaps are wet with alcohol they are more easily dispersed in oil but their ability to improve gel and fluid loss properties of the oil are only slightly improved.

Lithium soaps of rosin acids, unlike the potassium soaps, are quite solid. The lithium soaps, however, are very difficult to disperse in oil. The alcohol-wet lithium soaps tend to disperse in oil more readily than those which are not wet with alcohol. The dispersions of alcohol-wet lithium soaps have slightly improved gel strength and fluid loss properties compared to oil in the absence of the soaps. However, the effects are much less than those produced by the sodium soaps. In addition, the alcohol-wet lithium soaps have some tendency to settle from oil dispersions in the absence of special techniques of dispersing the soaps.

The sodium soaps, like the lithium soaps, are solids. Unlike the lithium soaps, however, the sodium soaps can be wet with alcohols to produce a highly oil dispersible form of the soaps. These have little, if any, tendency to settle out of the oil. Gel and fluid loss properties of oil can be greatly improved for drilling fluid purposes by dispersing the alcohol-wet sodium soaps in the oil.

I believe the reason for the unique action of the sodium soaps lies in the tendency of sodium ions to become associated with water. Apparently the ions have approximately an equal tendency to become associated with the hydroxyl group of alcohols. Thus, when a sodium soap of rosin acids is wet with an alcohol, the alcohol seems to become closely absorbed by the normally water-wet end of the rosin soap. The hydrocarbon radicals of the alcohols greatly decrease the water disperibility of the soap and increase the oil dispersibility. Oil dispersions of the alcohol-wet sodium soaps are not molecular dispersions. Some of the particles remain easily visible. Others are presumably in the form of micells in the colloidal range since the properties of oil dispersions are, in general, those of colloidal dispersions.

Lithium ions, like sodium ions, tend to become strongly attached to water. The tendencies of the lithium and sodium ions to become associated with the hydroxyl group of alcohols seem to differ considerably, however. The reason for this is not well understood. Possibly water molecules become so strongly attached to lithium ions that they cannot be easily displaced by alcohol molecules. Sodium, on the other hand, may hold water with a force intermediate between the strong attraction of lithium and the very small attraction of potassium and the other alkali metals. I do not, of course, wish to be bound by the above theories. I rely rather on the observed unique behavior of the alcohol-wet sodium soaps of the rosin acids when dispersed in oil, and the observed, relatively minor, similar actions of the lithium and potassium soaps.

Another critical factor is the ratio of alcohol to soap. If too much alcohol is used, the soap simply goes into solution and fails to produce the desired gel strength and reduction in fluid loss of the drilling fluid. If too little alcohol is used, the soap is not adequately wet and does not disperse properly in the oil. For adequate wetting of the soap the quantity of alcohol should be at least about 20 percent by weight of the mixture of soap and alcohol. Smaller amounts of alcohol can be used if desired, but some of the soap then remains inactive when it is dispersed in oil. As a result, larger amounts of such alcohol-wet soap must be used. The mixture should not contain more than about 50 percent by weight of the alcohol to avoid excessive solution of the soap. Preferably, the alcohol-wet soap should contain about 30 percent by weight alcohol and about 70 percent by weight of the soap. In this connection, it should be noted that most rosin soaps contain considerable inert materials such as the rosin oils. The percentage figures given above apply to the crude soaps which include such inert materials. Thus, when reference is made to a composition containing 70 percent of the sodium soaps of rosin, what is intended is 70 percent of the soaps commercially sold as sodium resinates under such trademarks as Dresinate XX and the like. The content of actual soaps is, of course, somewhat smaller. Usually the actual soap concentration in a commercial sodium resinate is only about 50 to 80 percent of the weight of the commercial resinate. When the term resinate is used hereinafter, the commercial resinate containing impurities will be intended unless otherwise specified. The term resinate will be used to indicate the sodium, lithium or potassium resinate, and not resinates in general.

The nature of the alcohol is also quite critical. The low molecular weight saturated aliphatic monohydric alcohols are the only alcohols found to be highly effective for wetting the resinates. Some wetting action is produced by alcohols containing as much as 12 carbon atoms per molecule. Beyond this point the wetting action generally is not sufficient to justify the greater cost of the alcohols. Polyhydric alcohols such as the glycols or glycerol are effective in treating the heavy metal resinates as noted in 2,573,960 Fischer. Such polyhydric alcohols, however, are much too effective as solvents for the alkali metal resinates to be used as wetting agents for these soaps, particularly in the concentrations suggested for the monohydric alcohols. In much lower concentrations even the polyhydric alcohols produce some effect on the alkali metal resinates. However, the effects are not equivalent to the effects of the monohydric alcohols. In addition, uniform mixing of the small quantities of glycols with the resinates is very difficult. Therefore, the polyhydric alcohols cannot be considered equivalents of the monohydric alcohols for my purposes.

Two specific alcohols should be considered separately as having unique properties. Isopropanol is much more readily mixed with the resinates than the other alcohols. A simple stirring action will cause the isopropanol to mix thoroughly and effectively with the resinates. Thus, this alcohol has a considerable advantage in ease of preparation of the wetted resinates. However, isopropanol is a somewhat better solvent for the resinates than the other monohydric alcohols. This probably explains the slightly smaller effectiveness of resinates wetted with this alcohol.

Methanol stands out as unique among the alcohols in effectiveness, particularly in preparing sodium resinates for imparting gel strength to oil base drilling fluid. The greater effectiveness generally justifies the difficulty of making the methanol wet the resinates. A simple stirring operation is not sufficient in this case. The stirring or mixing must be very vigorous. Preferably the methanol and soap should be ground together in a pugging mill or the like. The alcohol-wet resinate should then be allowed to age for several days, since aging greatly improves the effectiveness of the material. This is possibly due to a slow migration of alcohol to all the metallic ions and better replacement of water by alcohol. The aging operation is also advisable for resinates wet with other alcohols. A mixture of methanol and isopropanol may be used to obtain some of the advantages of both materials. Other mixtures of alcohols can also be used. In general, when reference is made to an alcohol, the term is to be interpreted broadly to include a single alcohol or a mixture of alcohols.

If any of the low boiling alcohols are used, particularly methanol, ethanol, or isopropanol, precautions should be taken to prevent loss of the volatile alcohols during the mixing operation or during storage before use. The alcohols eventually become rather tightly bound to the resinates, but considerable evaporation of the lower boiling alcohols still occurs. Preferably, the alcohol and alkali metal resinate should be ground together in a pressure vessel. The resulting paste should then be stored and shipped in sealed containers such as metal drums, cans, or the like.

The oil into which the alcohol wet resinate is dispersed should be a mineral oil, although it may be an animal oil such as whale oil or a vegetable oil such as cottonseed oil. It may be a refined petroleum fraction such as kerosene, diesel fuel, or the like, or it may be an unrefined fraction such as gas oil, some of the fuel oils, topped crude, or similar oils. Crude petroleum itself may be used in some cases if it does not have some objectionable property such as excessive viscosity, volatility, or the like. In general, an oil having flash and fire points less than those of kerosene and a viscosity greater than that of kerosene, should be used. The viscosity of the oil should not exceed about 100 centipoises as measured at about 80° F. by a Stormer viscosimeter rotating at about 600 r.p.m. This is to avoid excessively high viscosities of the drilling fluid employing the oil base. An exception may be made if the fluid is to be used in special applications such as hydraulic fracturing operations, for example. In any case, if the oil is too viscous, some kerosene or other light oil can be added. If the oil has insufficient viscosity, some more viscous oil such as bright stock, lubricating oil, or the like can be added. Thus, the type of mineral oil is not particularly critical so long as it is higher boiling than kerosene. The suitability of any particular oil can best be determined by using the oil to prepare a small pilot batch of drilling fluid which can be tested by standard API techniques.

The concentration of alcohol-wet resinate in the oil will depend upon a large number of factors such as the nature of the oil base, the alcohol used in wetting the resinate, other additives present in the oil, the conditions under which the drilling fluid is to be used, and the like. If most sodium resinates are wet with methanol and are used in a light oil base such as diesel oil, at least about 3 pounds of the alcohol-wet resinate per 42-gallon barrel of oil must be added if noticeable results are to be obtained. Commercially available oil base drilling fluids already have most of the desired drilling fluid properties. Therefore, as little as about 3 pounds per barrel of the alcohol-wet resinates may be added to such fluids to produce the small improvement required. For example, about 3 to 5 pounds of the alcohol-wet sodium resinate may be added per barrel of an oil base drilling fluid to impart sufficient gel strength to suspend weighting agents such as barium sulfate, ground oyster shells, or the like. Likewise, in a workover or cleanout operation of a well penetrating a low pressure, highly permeable formation, only 3 to 10 pounds of the alcohol-wet sodium resinate may be added per barrel of an oil used as a workover fluid to give the oil a little suspending power for loosened solids and to reduce the fluid loss of the oil to the formation. If a drilling fluid is to be prepared which relies principally on the alcohol-wet resinate to impart the usual oil base drilling fluid properties, however, from about 30 to about 50 pounds per barrel should generally be used. As much as 100 pounds per barrel can sometimes be added to some low viscosity oils before the gel strength and viscosity of the resulting drilling fluid becomes excessive. This is particularly true if a fairly large amount of an alcohol such as isopropanol has been used to wet the resinate. It will be apparent that while the concentration of the alcohol-wet resinate should generally be between about 3 and about 100 pounds per barrel of drilling fluid, a better rule is to add sufficient alcohol-wet resinate to produce the desired increase in gel strength and reduction in fluid loss of the drilling fluid.

The alcohol-wet resinate may vary in consistency from a sticky solid mass to a fairly thin paste. In any of these forms, it can be mixed into the oil by shoveling it into a mud pit or tank or any special mixing vessel, if desired, and agitating by a suitable means such as propeller mixers, mud guns, or the like. The alcohol-wet resinate disperses readily in a short time with only mild agitation. If desired, the alcohol-wet resinate may be blended with a small amount of oil before mixing into the main volume of oil. If an amount of oil approximately equal to the volume of the alcohol-wet resinate is employed, a smooth gelatinous blend is produced which is easier to handle than the alcohol-wet resinate in the absence of oil. In addition, it disperses into the main volume of oil even more readily than the oil-free, alcohol-wet resinate. The oil also has the advantage of decreasing the rate of evaporation of the alcohols. For the above reasons, it is frequently desirable to prepare a concentrate containing some oil as well as the alcohol-wet resinate.

Water may be present in the alcohol-wet resinate. Additional water may enter the oil base drilling fluid during use. It has been found that such water has a surprisingly small effect on the ability of the alcohol-wet resinates to perform their desired functions. Most commercially available resinates contain some water which was used to dissolve the alkali metal hydroxide employed in neutralizing the rosin acids. In addition, the reaction of the hydroxide with the acid produces water. Few, if any, of the resinates are water-free. This is not surprising, particularly in the case of sodium and lithium resinates, since the sodium and lithium ions hold water tenaciously. In the alcohol treatment, the alcohol simply replaces some of this water, probably by a mass action effect. The degree of replacement of water by alcohol or vice-versa seems to depend on the relative amounts of water and alcohol in contact with the resinate. It has been found possible to treat a concentrated aqueous solution of sodium resinate with alcohol and produce good oil dispersibility of the product. The aqueous soap solution in one case contained 13 percent by weight water. The mixture employed contained about twice as much isopropyl alcohol as water. This 2 to 1 ratio of alcohol to water was apparently sufficient to cause displacement of much of the water on the sodium resinate micells by alcohol. Regardless of the theory, this material was dispersed in diesel fuel to produce a composition having properties very similar to those produced by resinates having much less water.

Once the resinates are wet with alcohol and dispersed in oil, they seem to lose much of their tendency to become concentrated at oil-water interfaces to act as emulsifiers. When the normally water-wet ends of the soap molecules become wet by alcohol the entire molecules become oil dispersible. Therefore, these molecules remain dispersed throughout the body of the oil and there is little opportunity for contact with any water present as a separate phase of the drilling fluid. If the amount of water is sufficiently large, however, contact of the alcohol-wet resinates with water becomes great enough to cause a slow deterioration of the high-temperature gel-forming properties of these resinates. This is probably due, again, to a mass action effect in which water replaces the alcohol wetting the resinates. The resinates are thus reconverted to their usual partially water-wet condition in which they again act as emulsifying agents. I have found that oil base drilling fluids containing the oil wet resinates can tolerate up to about 20 percent by volume of water before the loss of effectiveness of the resinates becomes serious. Preferably, the amount of water in the oil base drilling fluid should be kept below about 10 percent by volume, if possible. For temporary gel strength improvement, often lasting many days, the alcohol-wet resinates can be used in water-in-oil emulsion drilling fluids containing 50 percent water, or even more.

A convenient concentrate for use in preparing or treating oil base drilling fluids can be prepared by mixing alcohol into concentrated aqueous solutions of the resinates. Preparation of such concentrates is simple because the alcohol mixes easily into the aqueous solutions and readily contacts the resinates. In addition, the resulting solution is much more fluid than the product of grinding a relatively dry resinate with the alcohol. It is much more easily handled and blended with oil for this reason.

The resinates themselves normally contain up to about 5 percent by weight of water. The concentrate may also contain added water to bring the amount of water up to approximately the weight of the alcohol present. This amount of water should not be exceeded in order to avoid the tendency for the water to replace the alcohol wetting the resinate.

As previously noted, the alcohol-wet resinates can be mixed into oil containing no other additives to form thickened fluids with decreased fluid loss to formations for such purposes as well workover or cleanout, or hydraulic fracturing. Such fluids can also be used with advantage in other applications such as those requiring relatively solids-free fluids for filling wells to be gun perforated or jet perforated. Still other applications of the simple oil dispersion of the alcohol-wet resinates will occur to those skilled in the art. These applications are, in general, the usual uses of oil base drilling fluids.

The principal application of the alcohol-wet resinates is as an additive to oil base drilling fluids already commercially available. In such applications, these resinates improve the gel strength and fluid loss properties of the drilling fluids. In such cases the usual oil base drilling fluid additives will be present. Almost all of these are compatible with the alcohol-wet resinates so that each additive continues to perform its usual function in the usual way. An exception is the alkaline earth salts such as calcium chloride or calcium oxide. These salts tend to react with the alkali metal resinates to form alkaline earth metal salts of the rosin acids. As previously noted, these have little effect, particularly at high temperatures. The amounts of such alkaline earth metal salts in oil base drilling fluids generally are quite small, however. In addition, these salts are usually in the aqueous phase where they cannot contact the oil-dispersed resinates. Therefore, the degree of reaction with the resinates usually is not sufficient to affect seriously the effectiveness of the alcohol-wet resinates. The presently available oil base drilling fluids, when treated with the alcohol-wet resinates, can be employed in the usual manner for well completion, fracturing, work-over, perforating, and the like, with the advantage that the fluids have a higher gel strength and a lower fluid loss, particularly at elevated temperatures.

My invention will be better understood from consideration of the following examples. In these examples, all reported properties of fluids were determined by the methods set out in API Recommended Procedure 29, third edition, May 1950, unless otherwise noted.

EXAMPLE I

An alcohol-wet sodium salt of rosin acids was prepared by stirring together 22 grams of Dresinate X, and 10 ml. of isopropanol. Dresinate X is the substantially neutral sodium salt of unmodified pale rosin. After thorough mixing, the alcohol-wet resinate was added to 350 ml. of diesel fuel having no gel strength. The resinate was dispersed in the oil by stirring for 20 minutes in a Hamilton Beach mixer at high speed. The dispersion was allowed to stand for 2½ days before properties were determined. The gel strength of the dispersion was first determined at room temperature of about 80° F. The tests were repeated at elevated temperatures. The results of the tests are presented in Table 1.

It will be apparent that the alcohol-wet resinate imparted gel strength to the oil and that this gel strength persisted, even at elevated temperatures.

Table 1

| Temperature, °F. | Stormer Gel Strength, Grams | |
|---|---|---|
| | Initial | 10 Min. |
| 80 | 10 | 24 |
| 150 | 10 | 19 |
| 190 | 10 | 20 |

EXAMPLE II

Alcohol-wet sodium resinates were prepared using isopropanol as the alcohol and Dresinate XX as the resinate. Dresinate XX is the substantially neutral sodium salt of unmodified dark wood rosin. It is somewhat darker in color than the Dresinate X used in Example I, but otherwise quite similar. In every case, 22 grams of Dresinate XX were employed, but the amount of isopropanol was varied. In each case, the isopropanol was simply stirred thoroughly into the resinate which was then mixed into 350 ml. of diesel fuel as described in Example I. The properties of the resulting dispersions were tested immediately. The results are presented in Table 2.

Table 2

| Amount of Alcohol, ml. | Stormer, Viscosity, cpse. | Stormer Gel Strength, Grams | | Fluid Loss, cc./30 Min. |
|---|---|---|---|---|
| | | Initial | 10 Min. | |
| 5 | 7 | 0 | 0 | 72 |
| 9 | 14 | 2 | 17 | 72 |
| 10 | 11 | 1 | 9 | 50 |
| 12 | 13 | 1 | 8 | 65 |
| 16 | 22 | 1 | 7 | 125 |

Several conclusions can be drawn from these data. First, if insufficient alcohol is used, the degree of wetting is not adequate to impart gel forming properties to the resinates. Some reduction in fluid loss does occur, however, since the diesel oil without the additive runs through the filter press very quickly. Second, if too much alcohol is used, it tends to dissolve the resinate, resulting in gel strength of oil dispersions considerably lower than those characteristic of optimum alcohol to resinate ratios. In addition, the fluid loss reducing properties are lost to a considerable degree. Third, these data in combination with those in Table 1 show that the grade of sodium resinate is not particularly critical. Additional data on this point are presented in Table 3.

EXAMPLE III

Alcohol-wet resinates were prepared using various alcohols and resinates. The amount of resinate in every case was 22 grams. The amount of alcohol used in each case is specified in Table 3. The isopropanol was simply stirred with the resinates. The other alcohols had to be ground intimately with the resinates. The oil into which the alcohol wet resinates were dispersed was diesel fuel. The method of mixing the resinate into the oil was the same as described in Example I. The dispersions were not allowed to stand before their properties were measured. Results of the tests are shown in Table 3.

Dresinate TX is the substantially neutral sodium salt of crude tall oil acids. As previously noted, Dresinate X is a light-colored sodium salt of rosin acids. Data in Table 3 show the operability of the monohydric alcohols for wetting these two types of sodium resinates. The resulting alcohol-wet resinates are obviously effective for improving gel strength and fluid loss properties of oil for drilling fluid purposes. The tall oil soaps produce higher gel strengths than the ordinary rosin soaps. In some cases this may be an advantage. It should be noted, however, that there is less difference between initial and 10-minute gel strengths. Thus, there is a tendency for oil base drilling fluids treated with alcohol-wet Dresinate TX to retain and recirculate bit cuttings. This is generally considered objectionable. Nearly ideal gel properties can be obtained by use of Dresinate X wet with methanol. Here the initial gel strength is fairly low to permit settling of bit cuttings in the mud pits, but a high gel strength develops rapidly to prevent settling of solids in the well if circulation is stopped for any reason. It is apparent that resinates wet with methanol are outstanding in this regard.

Table 3

| Resinate | Alcohol | | Stormer Visc., cpse. | Gel Strength, Grams | | Fluid Loss, cc./30 Min. |
|---|---|---|---|---|---|---|
| | Type | Amount, ml. | | Initial | 10 Min. | |
| Dresinate X | Methanol | 10 | 25 | 6 | 29 | 18 |
| Do | Ethanol | 10 | 19 | 3 | 12 | 17.5 |
| Do | Isopropanol | 10 | 9 | 1 | 3 | 45 |
| Do | N-Decanol | 10 | 13 | 1 | 8 | 20 |
| Do | Ethylene Glycol | 10 | Resinate dissolved in glycol | | | |
| Do | do | 2 | 23 | 9 | 9 | 97 |
| Do | do | 1 | 23 | 9 | 9 | 91 |
| Dresinate TX | Methanol | 10 | 112 | 36 | 40 | 13 |
| Do | Isopropanol | 10 | 19 | 4 | 12 | 28 |
| Do | N-Decanol | 10 | 48 | 6 | 18 | 19 |

An extreme case of high initial gel strength is found when the sodium resinates are wet with ethylene glycol. First, it should be noted that when the amount of glycol used is approximately the amount found best for the monohydric alcohols, the resinate completely dissolves in the glycol. As a result, the resinate glycol mixture does not improve gel strength or fluid loss properties of oil. When smaller amounts of ethylene glycol are used, uniform mixing with the resinate becomes very difficult or impossible. The resulting glycol-wet resinate disperses in oil to give some gel strength, but the initial gel is as high as the 10-minute gel. As previously noted, this is usually considered objectionable. In addition, it will be apparent that the glycol-wet resinates are much less effective in reducing fluid loss of the oil. For these reasons, the glycols cannot be considered equivalents of the monohydric alcohols.

One other point deserves comment. If the data for isopropanol-wet Dresinate X in Table 1 is compared to that in Table 3, it will be noted that they are different. The difference is due to the aging of the oil dispersion before obtaining the data in Table 1. The improved gel strength of aged dispersions of alcohol-wet resinates in oil is apparent.

EXAMPLE IV

In order to produce a drilling fluid having a low fluid loss which is characteristic of most commercially available oil base drilling fluids, a composition was prepared containing calcium chloride and lecithin as well as an alcohol-wet resinate. Such use of calcium chloride and lecithin is described in more detail and is claimed in my co-pending U.S. patent application S.N. 601,618, filed August 2, 1956. The composition of the drilling fluid is presented in Table 4.

Table 4

| Material | Amount |
|---|---|
| Wilmington Field, California Crude Oil | 36.5 gallons. |
| 17 pounds Dresinate XX wet with 5 pounds methanol | 22 pounds. |
| Ground oyster shells | 40 pounds. |
| Commercial Lecithin | 2.5 pounds. |
| Saturated Calcium Chloride Solution | 1.05 gallons. |

The properties of the resulting drilling fluid are shown in Table 5.

Table 5

| | |
|---|---|
| Stormer viscosity, cps. at 80° F. | 180 |
| Stormer gel strength, grams at 80° F.: | |
|   Initial | 3 |
|   10-minute | 12 |
| API fluid loss, cc./30-minute: | |
|   At 80° F. | 0 |
|   At 190° F. | 0 |

The excellent properties of the drilling fluid are apparent.

I claim:

1. The method of drilling a well comprising circulating in the well past the formations penerated by said well an oil-base drilling fluid comprising an oil and sufficient alcohol-wet resinate to impart the desired gel strength to said oil, said resinate being selected from the group consisting of sodium, lithium, and potassium salts of rosin acids, said alcohol being a saturated aliphatic monohydric alcohol containing from 1 to about 12 carbon atoms per molecule, and said alcohol-wet resinate containing from about 20 to about 50 percent by weight of alcohol and from about 50 to about 80 percent by weight of resinate, said resinate being pre-wet by said alcohol prior to mixing into said oil.

2. The method of claim 1 in which said resinate is the sodium salt of rosin acids and said alcohol is methanol.

References Cited in the file of this patent

UNITED STATES PATENTS

| | | |
|---|---|---|
| 2,097,085 | Fabian et al. | Oct. 26, 1937 |
| 2,335,908 | Borglin | Dec. 7, 1943 |
| 2,340,035 | Zimmer et al. | Jan. 25, 1944 |
| 2,550,054 | Fischer | Apr. 24, 1951 |
| 2,573,960 | Fischer | Nov. 6, 1951 |
| 2,588,808 | Dawson | Mar. 11, 1952 |
| 2,612,471 | Fischer | Sept. 30, 1952 |
| 2,825,409 | Ring | Mar. 4, 1958 |